United States Patent
Li et al.

(10) Patent No.: US 10,097,276 B2
(45) Date of Patent: Oct. 9, 2018

(54) METHOD AND DEVICE FOR SENDING AND RECEIVING AN OPTICAL SIGNAL

(71) Applicant: Beijing University of Posts and Telecommunications, Beijing (CN)

(72) Inventors: Yan Li, Beijing (CN); Miao Yu, Beijing (CN); Jian Wu, Beijing (CN); Jiangchuan Pang, Beijing (CN); Deming Kong, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 15/455,645

(22) Filed: Mar. 10, 2017

(65) Prior Publication Data

US 2017/0264369 A1    Sep. 14, 2017

(30) Foreign Application Priority Data

Mar. 14, 2016 (CN) .......................... 2016 1 0144598

(51) Int. Cl.
*H04L 1/00* (2006.01)
*H04B 10/516* (2013.01)
(Continued)

(52) U.S. Cl.
CPC ....... *H04B 10/5161* (2013.01); *H04B 1/0042* (2013.01); *H04B 10/5561* (2013.01); *H04L 1/00* (2013.01)

(58) Field of Classification Search
CPC combination set(s) only.
See application file for complete search history.

(56) References Cited

U.S. PATENT DOCUMENTS

2009/0186582 A1* 7/2009 Muhammad ........... H04B 1/525
                                                              455/63.1
2016/0277139 A1* 9/2016 Yoshida ................ H04J 14/021

FOREIGN PATENT DOCUMENTS

CN           105393487 A       3/2016
WO        2014/194940 A1      12/2014

OTHER PUBLICATIONS

Liu ,"M-ary pulse-position modulation and frequency shift keying with additional polarization/phase modulation for high-sensitivity optical transmission", Optics Express—vol. 19, No. 26, Dec. 2011, pp. 3-12.*

(Continued)

*Primary Examiner* — David Payne
*Assistant Examiner* — Omar S Ismail
(74) *Attorney, Agent, or Firm* — Patterson & Sheridan, LLP; Steven Versteeg

(57) ABSTRACT

The embodiments of the present application disclose a method and device for sending and receiving an optical signal. The method for sending an optical signal comprises: performing serial-to-parallel conversion on a data signal to be transmitted to obtain an I path data sequence, a Q path data sequence and a PPM path data sequence which are in parallel; performing mPQ-encoding on the I path data sequence, the Q path data sequence and the PPM path data sequence to obtain an I path and a Q path of an mPQ-encoded digital signal; shaping the I path and the Q path of the mPQ-encoded digital signal by Nyquist-filtering to obtain an I path and Q path of a filtered digital signal; performing digital-to-analog conversion on the I path and the Q path of the filtered digital signal and mapping the converted I path and Q path onto an optical carrier to obtain a target optical signal and send the same. By applying the embodiments of the present application, spectral efficiency (Continued)

loss in optical communication can be reduced or even eliminated while power efficiency is increased.

10 Claims, 5 Drawing Sheets

(51) Int. Cl.
  *H04B 1/00* (2006.01)
  *H04B 10/556* (2013.01)

(56) References Cited

OTHER PUBLICATIONS

Selmy, et al.; Performance Enhancement of QPSK Modulation Using Hybrid QPSK-modified MPPM in Optical Fiber Communications; dated 2013; 3 total pages.

* cited by examiner

METHOD AND DEVICE FOR SENDING AND RECEIVING AN OPTICAL SIGNAL

CROSS REFERENCE TO RELATED APPLICATION

The present application claims the benefit of priority to Chinese Patent Application No. 201610144598.0, filed on Mar. 14, 2016, and entitled "Method and Device for Sending and Receiving an Optical Signal", which is hereby incorporated into the present application by reference herein in its entirety.

TECHNICAL FIELD

The present application relates to the technical field of optical communication, in particular to a method and device for sending and receiving an optical signal.

BACKGROUND

In an optical communication system, information is transmitted by using optical signals of different modulation formats as carriers. Modulation format is mainly used for carrying and transmitting information. Requirement for modulation formats mainly aims at fast transmission rate and good signal quality, wherein the indicator for measuring the transmission rate is spectral efficiency and the indicator for measuring the transmission quality is power efficiency. In order to transmit signals in longer distance with faster rate and greater capacity, it is an important research content to continuously improve modulation formats of transmission signals. In order to increase transmission capacity, high order modulation format is generally used, for example, Quadrature Phase-Shift Keying (QPSK) and 16-ary Quadrature Amplitude Modulation (16QAM), etc. Signals of these modulation formats can transmit multiple bits of information at each sign bit. In order to increase transmission distance, signals are required to have better power efficiency, for example, M-ary Pulse Position Modulation (mPPM) signals. In 2011, polarization-division-multiplexed mPQ modulation (mPPM-QPSK, combined modulation of M-ary Pulse Position Modulation and Quadrature Phase-Shift Keying) signal was proposed by Bell Laboratory, which initially achieves a transmission system with large capacity and high power efficiency. However, compared to QPSK, this method sacrifices a large amount of transmission bandwidth while achieving higher power efficiency, which directly results in a decrease in spectral efficiency of the transmission signal (spectral efficiency mainly refers to bit rate of transmission/bandwidth occupied by optical signals).

Specifically, the above-mentioned mPQ modulation format is a combined modulation of M-ary Pulse Position Modulation on basis of polarization-division-multiplexed QPSK/QAM signals. Each original sign bit is divided into m signal slots, wherein one of the signal slots is loaded with the information in the original sign bit, and the time domain width of each signal slot is only 1/m of the time domain width of each original sign bit, and thus, the bandwidth in frequency domain occupied by the signal is m times of that of the original signal. Furthermore, the ability of mPQ modulation format to improve the bit rate of signal transmission is poor, such that signal spectral efficiency (bit rate of transmission/bandwidth occupied by optical signals) is significantly decreased. Under the condition that hardware equipment of the entire set transmission system is unchanged, transmission signal cannot exceed the maximum signal bandwidth which an electric equipment can meet, and then an mPQ signal with poorer spectral efficiency can only achieve lower transmission rate, which restricts transmission capacity.

Thus, how to decrease spectral efficiency loss or even eliminate spectral efficiency loss in optical communication while improving power efficiency is an urgent problem to be solved.

SUMMARY OF THE INVENTION

The embodiments of the present application disclose a method and device for sending and receiving an optical signal, which are capable of decreasing spectral efficiency loss or even eliminating the same in optical communication while improving power efficiency. The specific technical solution is as follows:

In a first aspect, embodiments of the present application provide a method for sending an optical signal. The method comprises:

performing serial-to-parallel conversion on a data signal to be transmitted to obtain an I path data sequence, a Q path data sequence and a PPM path data sequence which are in parallel;

performing combined encoding of M-ary Pulse Position Modulation and Quadrature Phase-Shift Keying (mPQ-encoding) on the I path data sequence, the Q path data sequence and the PPM path data sequence to obtain an I path and a Q path of an mPQ-encoded digital signal;

shaping the I path and the Q path of the mPQ-encoded digital signal by Nyquist-filtering to obtain an I path and a Q path of a filtered digital signal;

performing digital-to-analog conversion on the I path and the Q path of the filtered digital signal to obtain an I path and a Q path of an analog signal; and mapping the I path and the Q path of the analog signal onto an optical carrier to obtain a target optical signal and send the same.

Specifically, the step of performing mPQ-encoding on the I path data sequence, the Q path data sequence and the PPM path data sequence to obtain an I path and a Q path of an mPQ-encoded digital signal comprises:

performing Quadrature Phase-Shift Keying (QPSK)-encoding on the I path data sequence and the Q path data sequence to obtain an I path and a Q path of a QPSK-encoded digital signal;

performing M-ary Phase Position Modulation (mPPM)-encoding on the PPM path data sequence to obtain an mPPM-encoded PPM path data sequence; and processing the I path and the Q path of the QPSK-encoded digital signal with the mPPM-encoded PPM path data sequence according to a preset method, to obtain the I path and the Q path of the mPQ-encoded digital signal.

In a second aspect, embodiments of the present application provide a method for sending an optical signal. The method comprises:

performing serial-to-parallel conversion on a data signal to be transmitted to obtain an I path data sequence, a Q path data sequence and a PPM path data sequence which are in parallel;

encoding the I path data sequence, the Q path data sequence and the PPM path data sequence to obtain an I path and a Q path of a Quadrature Phase-Shift Keying (QPSK)-encoded digital signal and an M-ary Phase Position Modulation (mPPM)-encoded PPM path data sequence;

performing digital-to-analog conversion on the I path and the Q path of the QPSK-encoded digital signal and the mPPM-encoded PPM path data sequence to obtain an I path, a Q path and a PPM path of an encoded analog signal;

mapping the I path and the Q path of the analog signal onto an optical carrier to obtain an optical signal;

loading the PPM path of the analog signal into the optical signal to obtain an intermediate optical signal; and shaping the intermediate optical signal by Nyquist-filtering to obtain a target optical signal and send the same.

Specifically, the step of encoding the I path data sequence, the Q path data sequence and the PPM path data sequence to obtain an I path and a Q path of a QPSK-encoded digital signal and an mPPM-encoded PPM path data sequence comprises:

performing QPSK-encoding on the I path data sequence and the Q path data sequence to obtain the I path and the Q path of the QPSK-encoded digital signal; and performing mPPM-encoding on the PPM path data sequence to obtain the mPPM-encoded PPM path data sequence.

In a third aspect, embodiments of the present application provide a method for receiving an optical signal. The method comprises steps of:

converting a received target optical signal into an I path and a Q path of an analog signal with a local optical carrier by coherent detection;

performing analog-to-digital conversion on the I path and the Q path of the analog signal to obtain an I path and a Q path of a digital signal;

performing mPQ-decoding on the I path and the Q path of the digital signal to obtain an original I path data sequence, an original Q path data sequence and an original PPM path data sequence; and performing parallel-to-serial conversion on the original I path data sequence, the original Q path data sequence and the original PPM path data sequence to obtain a target data signal.

Specifically, the step of performing mPQ-decoding on the I path and the Q path of the digital signal to obtain an original I path data sequence, an original Q path data sequence and an original PPM path data sequence comprises:

processing the I path and the Q path of the digital signal according to a preset method to obtain an I path and a Q path of a QPSK-encoded digital signal and an mPPM-encoded PPM path data sequence;

performing mPPM-decoding on the mPPM-encoded PPM path data sequence to obtain the original PPM path data sequence; and performing QPSK-decoding on the I path and the Q path of the QPSK-encoded digital signal to obtain the original I path data sequence and the original Q path data sequence.

In a fourth aspect, embodiments of the present application provide a device for sending an optical signal. The device comprises:

a serial-to-parallel converter for performing serial-to-parallel conversion on a data signal to be transmitted to obtain an I path data sequence, a Q path data sequence and a PPM path data sequence which are in parallel;

an mPQ-encoder for performing combination encoding of M-ary Pulse Position Modulation and Quadrature Phase-Shift Keying (mPQ-encoding) on the I path data sequence, the Q path data sequence and the PPM path data sequence to obtain an I path and a Q path of an mPQ-encoded digital signal;

a filter for shaping the I path and the Q path of the mPQ-encoded digital signal by Nyquist-filtering to obtain an I path and a Q path of a filtered digital signal;

a digital-to-analog converter for performing digital-to-analog conversion on the I path and the Q path of the filtered digital signal to obtain an I path and a Q path of an analog signal; and a mapping-and-sending circuitry for mapping the I path and the Q path of the analog signal onto an optical carrier to obtain a target optical signal and send the same.

Specifically, the mPQ-encoder comprises:

a QPSK-encoder for performing QPSK-encoding on the I path data sequence and the Q path data sequence to obtain an I path and a Q path of a QPSK-encoded digital signal;

an mPPM-encoder for performing mPPM-encoding on the PPM path data sequence to obtain an mPPM-encoded PPM path data sequence; and a processing sub-circuitry for processing the I path and the Q path of the QPSK-encoded digital signal with the mPPM-encoded PPM path data sequence according to a preset method, to obtain the I path and the Q path of the mPQ-encoded digital signal.

In a fifth aspect, embodiments of the present application provide a device for sending an optical signal. The device comprises:

a serial-to-parallel converter for performing serial-to-parallel conversion on a data signal to be transmitted to obtain an I path data sequence, a Q path data sequence and a PPM path data sequence which are in parallel;

an mPQ-encoder for encoding the I path data sequence, the Q path data sequence and the PPM path data sequence to obtain an I path and a Q path of a QPSK-encoded digital signal and an mPPM-encoded PPM path data sequence;

a digital-to-analog converter for performing digital-to-analog conversion on the I path and the Q path of the QPSK-encoded digital signal and the mPPM-encoded PPM path data sequence to obtain an I path, a Q path and a PPM path of an encoded analog signal;

a mapping circuitry for mapping the I path and the Q path of the analog signal onto an optical carrier to obtain an optical signal;

a loading circuitry for loading the PPM path of the analog signal into the optical signal to obtain an intermediate optical signal; and a filter-and-sending circuitry for shaping the intermediate optical signal by Nyquist-filtering to obtain a target optical signal and send the same.

Specifically, the mPQ-encoder comprises:

a QPSK-encoder for performing QPSK-encoding on the I path data sequence and the Q path data sequence to obtain the I path and the Q path of the QPSK-encoded digital signal; and an mPPM-encoder for performing mPPM-encoding on the PPM path data sequence to obtain the mPPM-encoded PPM path data sequence.

In a sixth aspect, embodiments of the present application provide a device for receiving an optical signal. The device comprises:

a photoelectric converter for converting a received target optical signal into an I path and a Q path of an analog signal with a local optical carrier by coherent detection;

an analog-to-digital converter for performing analog-to-digital conversion on the I path and the Q path of the analog signal to obtain an I path and a Q path of a digital signal;

an mPQ-decoder for performing mPQ-decoding on the I path and the Q path of the digital signal to obtain an original I path data sequence, an original Q path data sequence and an original PPM path data sequence; and a parallel-to-serial converter for performing parallel-to-serial conversion on the original I path data sequence, the original Q path data sequence and the original PPM path data sequence to obtain a target data signal.

Specifically, the mPQ-decoder comprises:

a processing sub-circuitry for processing the I path and the Q path of digital signals according to a preset method to obtain an I path and a Q path of a QPSK-encoded digital signal and an mPPM-encoded PPM path data sequence;

an mPPM-decoder for performing mPPM-decoding on the mPPM-encoded PPM path data sequence to obtain the original PPM path data sequence; and a QPSK-decoder for performing QPSK-decoding on the I path and the Q path of the QPSK-encoded digital signal to obtain the original I path data sequence and the original Q path data sequence.

In conclusion, in the method and device for sending and receiving an optical signal according to the embodiments of the present application, after a serial-to-parallel conversion is performed on a data signal to be transmitted, the obtained I path data sequence, Q path data sequence and PPM path data sequence which are in parallel are mPQ-encoded; after obtaining the I path and the Q path of an mPQ-encoded digital signal, different from the prior art in which the I path and the Q path of the mPQ-encoded digital signal are converted from digital to analog directly and then are mapped with an optical carrier, in the present application the I path and the Q path of the mPQ-encoded digital signal are shaped by Nyquist-filtering and the I path and Q path of the filtered digital signal are converted from digital to analog and then are mapped with the optical carrier. In the prior art, the method, in which the I path and the Q path of the mPQ-encoded digital signal are converted from digital to analog directly and then are mapped with an optical carrier, sacrifices a large amount of transmission bandwidth when obtaining a high power efficiency, resulting in a decrease in spectral efficiency of transmission signal. The method according to embodiments of the present application, in which the I path and the Q path of the mPQ-encoded digital signal are shaped by Nyquist-filtering, can effectively reduce transmission bandwidth of an optical signal and thereby achieve the purpose of decreasing or even eliminating loss in spectral efficiency while improving power efficiency.

Of course, implementing any of the products or methods of the present application will not necessarily achieve all of the above advantages at the same time.

BRIEF DESCRIPTION OF DRAWINGS

In order to describe the technical solutions in the embodiments of the present application or the prior art, the figures which are to be used in the description of the embodiments or the prior art will be briefly explained below. Obviously, the figures are only several embodiments of the present application, and those skilled in the art can also obtain other figures based on these figures without creative efforts.

DETAILED DESCRIPTION OF THE INVENTION

The technical solutions in the embodiments of the present application will be clearly and completely described below in combination with the figures of the embodiments of the present application. Obviously, the described embodiments are only parts of the embodiments of the present application rather than all the embodiments thereof. Based on the embodiments of the present application, all the other embodiments obtained by those skilled in the art without creative efforts fall into the protection scope of the present application.

The embodiments of the present application provide a method for sending and receiving an optical signal, and the present application is specifically described below by means of detailed embodiments.

It should be explained in advance that in the combined encoding of M-ary Pulse Position Modulation (mPPM) and Quadrature Phase-Shift Keying (QPSK) (mPQ-encoding) method according to the embodiments of the present application, the M-ary Pulse Position Modulation (mPPM) encoding can be 2-ary Pulse Position Modulation (2PPM) encoding or 4-ary Pulse Position Modulation (4PPM) encoding and the like, the specific implementation ways of which are not limited in the present application.

Embodiments of the present application provide a method for sending an optical signal, which is divided into electric domain generating scheme or optical domain generating scheme according to whether signals are generated in electric domain or in optical domain in particular embodiments. A method for sending an optical signal provided by an embodiment of the present application will be introduced below based on the scheme in which signals are generated in electric domain.

Figure 1:
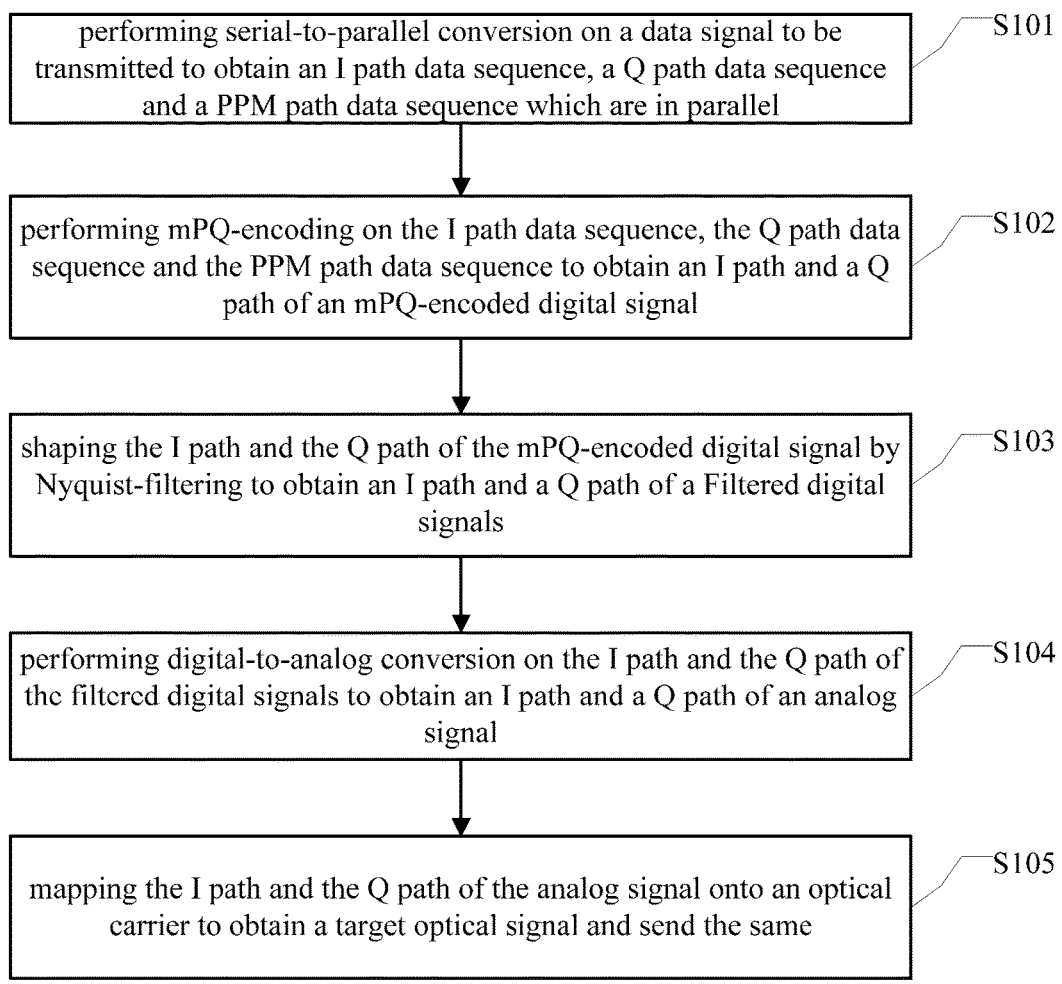
FIG. 1 is a schematic flowchart of a method for sending an optical signal provided by an embodiment of the present application.

FIG. 1 shows a flowchart of a method for sending an optical signal provided by an embodiment of the present application.

As shown in FIG. 1, the method for sending an optical signal provided by the embodiment of the present application comprises steps of:

S101, performing serial-to-parallel conversion on a data signal to be transmitted to obtain an I path data sequence, a Q path data sequence and a PPM path data sequence which are in parallel.

It should be noted that, since the embodiments of the present application use, at the sending end, a combined encoding of M-ary Pulse Position Modulation (mPPM) and Quadrature Phase-Shift Keying (QPSK) (mPQ-encoding) method, the data signal to be transmitted has to be converted from serial to parallel in order to obtain the I path data sequence, the Q path data sequence and the PPM path data sequence which are in parallel. In addition, it is required to determine a specific manner of the serial-to-parallel conversion according to a subsequent M-ary Pulse Position Modulation (mPPM) encoding manner before performing serial-to-parallel conversion. In the case that the subsequent M-ary Pulse Position Modulation (mPPM) encoding manner is 2-ary Pulse Position Modulation (2PPM) encoding, during serial-to-parallel conversion, the 1st, 4th, 7th, . . . and (3k-2)-th bits of the data signal to be transmitted are converted to an I path data sequence, the 2nd, 5th, 8th, . . . and (3k-1)-th bits are converted to a Q path data sequence, and the 3rd, 6th, 9th, and 3k-th bits are converted to a PPM path data sequence. Whereas in the case that the subsequent M-ary Pulse Position Modulation (mPPM) encoding manner is 4-ary Pulse Position Modulation (4PPM) encoding, during serial-to-parallel conversion, the 1st, 5th, 9th, . . . and (4k-3)-th bits of the data signal to be transmitted are converted to an I path data sequence, the 2nd, 6th, 10th, . . . and (4k-2)-th bits are converted to a Q path data sequence, and the 3rd, 4th, 7th, 8th, . . . (4k-1)-th and the 4kth bits are converted to a PPM path data sequence.

For illustration, for a digital signal of a 12-bit set to be transmitted such as 111001011100, in the case of 2-ary Pulse Position Modulation (2PPM) encoding, the I path data sequence obtained from serial-to-parallel conversion is 1001, the Q path data sequence obtained from serial-to-parallel conversion is 1010 and the PPM path data sequence obtained from serial-to-parallel conversion is 1110; in the case of 4-ary Pulse Position Modulation (4PPM) encoding, the I path data sequence obtained from serial-to-parallel conversion is 101, the Q path data sequence obtained from serial-to-parallel conversion is 111 and the PPM path data sequence obtained from serial-to-parallel conversion is 100100.

The step of performing serial-to-parallel conversion on a data signal to be transmitted to obtain an I path data sequence, a Q path data sequence and a PPM path data sequence which are in parallel can be achieved by means of a serial-to-parallel converting device, the specific process of which will not be repeated here.

S102, performing mPQ-encoding on the I path data sequence, the Q path data sequence and the PPM path data sequence to obtain an I path and a Q path of an mPQ-encoded digital signal.

Specifically, the step of performing mPQ-encoding on the I path data sequence, the Q path data sequence and the PPM path data sequence to obtain an I path and a Q path of an mPQ-encoded digital signal comprises:

performing QPSK-encoding on the I path data sequence and the Q path data sequence to obtain an I path and a Q path of a QPSK-encoded digital signal;

performing mPPM-encoding on the PPM path data sequence to obtain an mPPM-encoded PPM path data sequence; and processing the I path and the Q path of the QPSK-encoded digital signal with the mPPM-encoded PPM path data sequence according to a preset method, to obtain the I path and the Q path of the mPQ-encoded digital signal.

For illustration, the step of performing QPSK-encoding on the I path data sequence and the Q path data sequence obtained in S101 to obtain the I path and Q path of the QPSK-encoded digital signal is specifically as follows:

In the case of 2-ary Pulse Position Modulation (2PPM) encoding, the I path data sequence obtained in step S101 is 1001and the Q path data sequence obtained in step S101 is 1010, and then the I path of the QPSK-encoded digital signal obtained from QPSK-encoding is +1−1−1+1 and the Q path of the QPSK-encoded digital signal obtained from QPSK-encoding is +1−1+1−1. In the case of 4-ary Pulse Position Modulation (4PPM) encoding, the I path data sequence obtained in step S101 is 101and the Q path data sequence obtained in step S101 is 111,and then the I path of QPSK-encoded digital signal obtained from QPSK-encoding is +1−1+1, the Q path of QPSK-encoded digital signal obtained from QPSK-encoding is +1+1+1.

The step of performing mPPM-encoding on the PPM path data sequence obtained in step S101 to obtain an mPPM-encoded PPM path data sequence is specifically as follows:

in the case of 2-ary Pulse Position Modulation (2PPM) encoding, the PPM path data sequence obtained in step S101 is 1110,and the PPM path data sequence obtained from mPPM-encoding is 10101001; in the case of 4-ary Pulse Position Modulation (4PPM) encoding, the PPM path data sequence obtained in step S101 is 100100, and the PPM path data sequence obtained from mPPM-encoding is 010000100001.

The step of processing the I path and the Q path of the QPSK-encoded data signal with the mPPM-encoded PPM path data sequence according to a preset method comprises:

multiplying the data in each corresponding bit of the I path and the Q path of the QPSK-encoded digital signal by the data in the corresponding bit of the mPPM-encoded PPM path data sequence to obtain the I path and the Q path of the mPQ-encoded digital signal, which is specifically as follows:

in the case of 2-ary Pulse Position Modulation (2PPM) encoding, the I path of the mPQ-encoded digital signal obtained is +10−10−100+1 and the Q path of the mPQ-encoded digital signal obtained is +10−10+100−1; in the case of 4-ary Pulse Position Modulation (4PPM) encoding, the I path of mPQ-encoded digital signal obtained is 0+10000−10000+1 and the Q path of the mPQ-encoded digital signal obtained is 0+10000+10000+1.

Specifically, the step of performing mPQ-encoding on the obtained I path data sequence, Q path data sequence and PPM path data sequence which are in parallel to obtain an I path and a Q path of an mPQ-encoded digital signal belongs to the prior art, the specific process of which will not be repeated here.

S103, shaping the I path and the Q path of the mPQ-encoded digital signal by Nyquist-filtering to obtain an I path and a Q path of a filtered digital signal;

It should be noted that, the step of shaping the I path and the Q path of the mPQ-encoded digital signal by Nyquist-filtering can be realized by means of a set of Nyquist filtering and shaping devices with reference to the prior art, which will not be repeated here. In the step of shaping the I path and the Q path of the mPQ-encoded digital signal by Nyquist-filtering to obtain an I path and a Q path of a filtered digital signal, the modulation format of the filtered digital signal is N-mPQ modulation format (Nyquist-mPPM-QPSK, combined modulation of Nyquist-type M-ary Pulse Position Modulation and Quadrature Phase-Shift Leying (QPSK)).

S104, performing digital-to-analog conversion on the I path and Q path of the filtered digital signal to obtain an I path and a Q path of an analog signal.

It should be noted that, the step of performing digital-to-analog conversion on the I path and Q path of the filtered digital signal to obtain an I path and a Q path of an analog signal can be achieved by means of a set of digital-to-analog conversion devices of the prior art, the specific process of which will not be repeated here.

S105, mapping the I path and the Q path of the analog signal onto an optical carrier to obtain a target optical signal and send the same.

It should be noted that, the step of mapping the I path and the Q path of the analog signal onto an optical carrier of the present application can be achieved by means of a laser, a set of electric signal amplification devices and an IQ modulator of the prior art. The laser is used for generating an optical carrier, the electric signal amplification devices are used for providing the driving voltage required by the IQ modulator and the IQ modulator is used for mapping the I path and Q path of an analog signal onto the optical carrier, the specific process of which will not be repeated here.

By applying the electric domain generating scheme of the embodiment of the present application, a digital signal to be transmitted is converted from serial to parallel and the obtained I path data sequence, Q path data sequence and PPM path data sequence which are in parallel are mPQ-encoded; after obtaining the I path and the Q path of an mPQ-encoded digital signal, different from the prior art in which the I path and the Q path of the mPQ-encoded digital signal are converted directly from digital to analog and then are mapped with an optical carrier, the I path and the Q path of an mPQ-encoded digital signal in the present application are shaped by Nyquist-filtering and the I path and Q path of the filtered digital signal are converted from digital to analog and then are mapped with the optical carrier. In the prior art, the method, in which the I path and the Q path of an mPQ-encoded digital signal are converted directly from digital to analog and then are mapped with an optical carrier, sacrifices a large amount of transmission bandwidth when obtaining a high power efficiency, resulting in a decrease in spectral efficiency of transmission signal. The method of the embodiment of the present application, in which the I path and the Q path of an mPQ-encoded digital signal are shaped by Nyquist-filtering, can effectively reduce transmission bandwidth of an optical signal and thereby achieve the purpose of decreasing or even eliminating loss in spectral efficiency while improving power efficiency.

Figure 2:
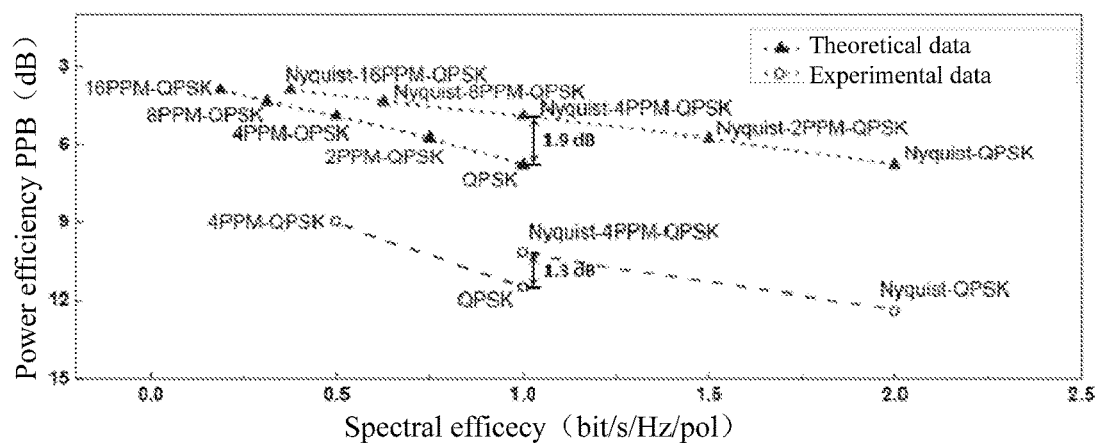
FIG. 2 is a comparison diagram of relationship between power efficiency and spectral efficiency of optical signals with different modulation formats provided by an embodiment of the present application.

FIG. 2 shows a comparison diagram of relationship between power efficiency and spectral efficiency of optical signals with different modulation formats provided by embodiments of the present application, in which the abscissa is spectral efficiency (bits/s/Hz/pol) and the ordinate is power efficiency PPB (dB). Wherein the two lines shown on the upper side of FIG. 2 are theoretical data and the two lines shown on the lower side are experimental data. It can be seen in FIG. 2 that for the experimental data, the Nyquist-4PPM-QPSK modulation format of the embodiments of the present application can double the spectral efficiency without decreasing power efficiency, compared to 4PPM-QPSK modulation format; and for the theoretic data, the Nyquist-4PPM-QPSK modulation format of the embodiments of the present application has a power advantage of 1.9 dB with the same spectral efficiency compared to QPSK modulation format.

Figure 3:
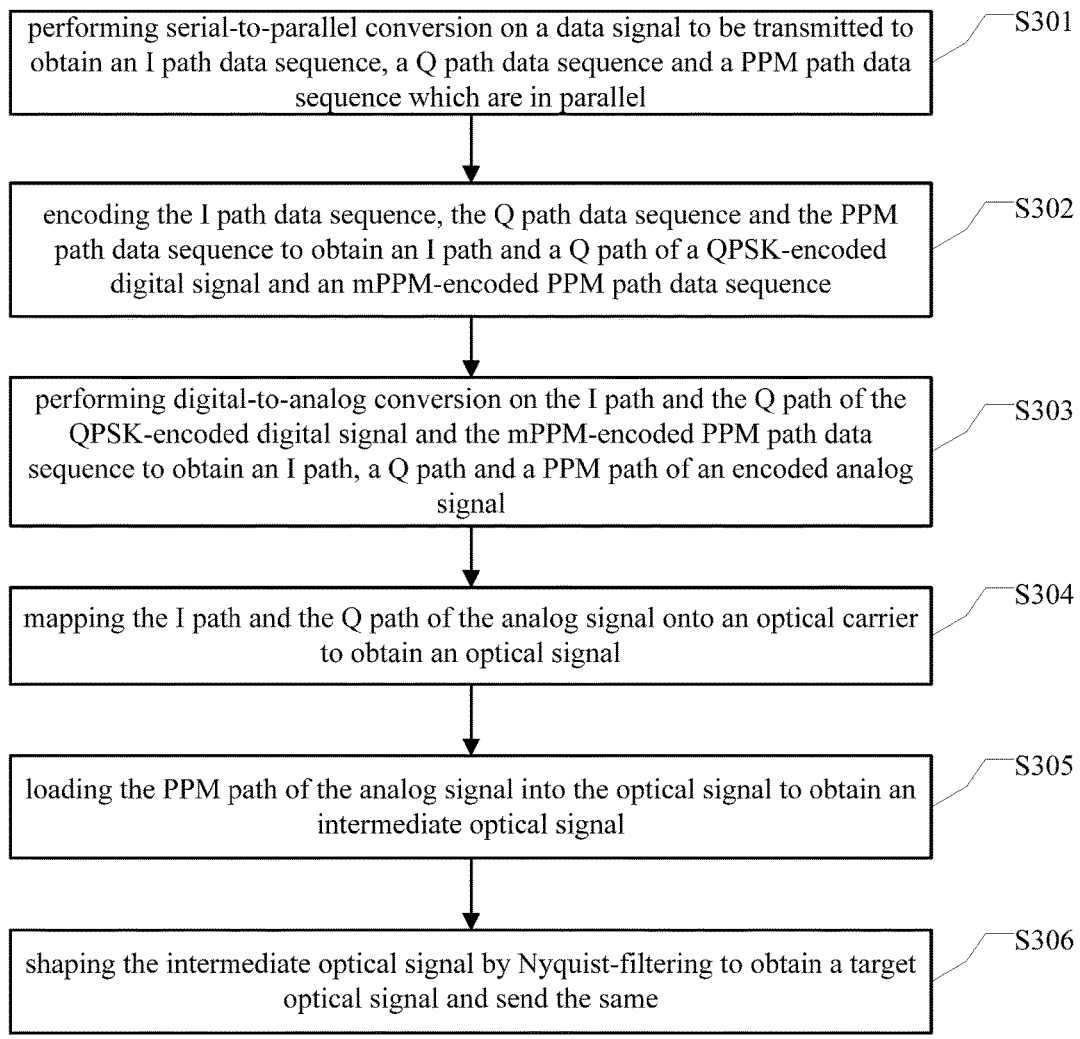
FIG. 3 is a schematic flowchart of another method for sending an optical signal provided by an embodiment of the present application.

A method for sending an optical signal provided by an embodiment of the present application will be introduced below based on the scheme in which signals are generated in optical domain. FIG. 3 shows a flowchart of another method for sending an optical signal provided by an embodiment of the present application.

As shown in FIG. 3, the method for sending an optical signal provided by the embodiment of the present application comprises steps of:

S301, performing serial-to-parallel conversion on a data signal to be transmitted to obtain an I path data sequence, a Q path data sequence and a PPM path data sequence which are in parallel.

It should be noted that, since the embodiments of the present application use, at the sending end, a combined encoding of M-ary Pulse Position Modulation (mPPM) and Quadrature Phase-Shift Keying (QPSK) (mPQ-encoding) method, the data signal to be transmitted has to be converted from serial to parallel in order to obtain the I path data sequence, the Q path data sequence and the PPM path data sequence which are in parallel. With respect to the specific process of performing serial-to-parallel conversion on a data signal to be transmitted in order to obtain an I path data sequence, a Q path data sequence and a PPM path data sequence which are in parallel, reference can be made to the corresponding content in the serial-to-parallel converting method provided by the above-mentioned method for sending an optical signal, which will not be repeated here.

S302, encoding the I path data sequence, the Q path data sequence and the PPM path data sequence to obtain an I path and a Q path of a QPSK-encoded digital signal and an mPPM-encoded PPM path data sequence.

Specifically, the step of encoding the I path data sequence, the Q path data sequence and the PPM path data sequence to obtain an I path and a Q path of a QPSK-encoded digital signal and an mPPM-encoded PPM path data sequence comprises:

performing QPSK-encoding on the I path data sequence and the Q path data sequence to obtain the I path and the Q path of the QPSK-encoded digital signal; and performing mPPM-encoding on the PPM path data sequence to obtain the mPPM-encoded PPM path data sequence.

It should be noted that, with respect to the specific process of encoding the I path data sequence, the Q path data sequence and the PPM path data sequence to obtain an I path and a Q path of a QPSK-encoded digital signal and an mPPM-encoded PPM path data sequence, reference can be made to the corresponding content in the mPQ-encoding method provided by the above-mentioned method for sending an optical signal, which will not be repeated here.

S303, performing digital-to-analog conversion on the I path and Q path of the QPSK-encoded digital signal and the mPPM-encoded PPM path data sequence to obtain an I path, a Q path and a PPM path of an encoded analog signal.

It should be noted that, the specific process of performing digital-to-analog conversion on the I path and the Q path of the QPSK-encoded digital signal and the mPPM-encoded PPM path data sequence to obtain an I path, a Q path and a PPM path of an encoded analog signal can be achieved by means of a set of digital-to-analog conversion devices of the prior art, which will not be repeated here.

S304, mapping the I path and the Q path of the analog signal onto an optical carrier to obtain an optical signal.

It should be noted that, the step of mapping the I path and the Q path of the analog signal onto an optical carrier to obtain an optical signal can be achieved by means of a laser, a set of electric signal amplification devices and an IQ modulator of the prior art. The laser is used for generating an optical carrier, the electric signal amplification devices are used for providing the driving voltage required by the IQ modulator and the IQ modulator is used for mapping the I path and Q path of analog signals onto the optical carrier, the specific process of which will not be repeated here.

S305, loading the PPM path of the analog signal into the optical signal to obtain an intermediate optical signal.

It should be noted that, the step of loading the PPM path of the analog signal into the optical signal to obtain an intermediate optical signal can be achieved by means of electric signal amplification devices and an intensity modulator of the prior art. The electric signal amplification devices are used for providing the driving voltage required by the intensity modulator and the intensity modulator is used for loading the PPM path of the analog signal into the optical carrier, the specific process of which will not be repeated here.

S306, shaping the intermediate optical signal by Nyquist-filtering to obtain a target optical signal and send the same.

It should be noted that, the step of shaping the intermediate optical signal by Nyquist-filtering of the present application can be achieved by means of optical filters of the prior art, which will not be repeated here.

By applying the optical domain generating scheme of the present application, after the data signal to be transmitted is converted form serial to parallel, the obtained I path data sequence, Q path data sequence and PPM path data sequence which are in parallel are encoded; after obtaining an I path and a Q path of a QPSK-encoded digital signal and an mPPM-encoded PPM path data sequence, the I path and the Q path of the QPSK-encoded digital signal and the mPPM-encoded PPM path data sequence are converted from digital to analog in order to obtain an I path, a Q path and a PPM path of an encoded analog signal; the I path and the Q path of the analog signal are mapped onto the optical carrier to obtain an optical signal; the PPM path of the analog signal is loaded into the optical signal to obtain the intermediate optical signal; and the intermediate optical signal is shaped by Nyquist-filtering to obtain a target optical signal and send the same. By using the mPQ-encoding method, power efficiency can be improved and the intermediate optical signal can be shaped by Nyquist-filtering after the intermediate optical signal is obtained, which can effectively reduce transmission bandwidth of an optical signal and thereby improve spectral efficiency compared with the prior art.

Figure 4:
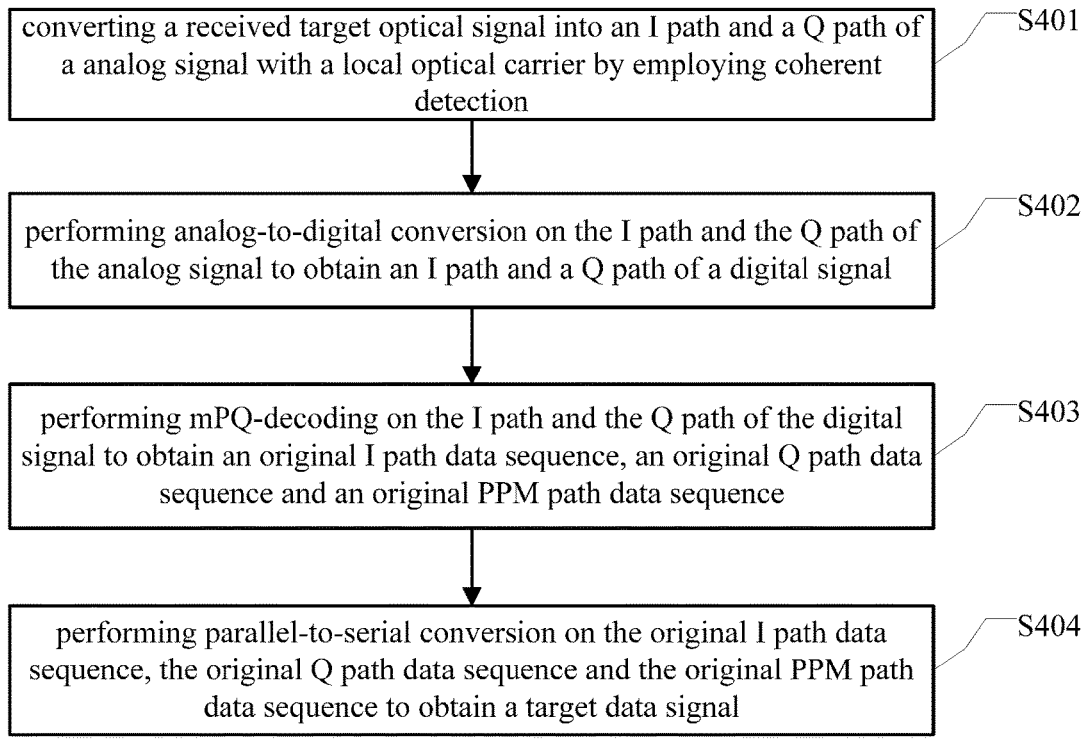
FIG. 4 is a schematic flowchart of a method for receiving an optical signal provided by an embodiment of the present application.

FIG. 4 shows a flowchart of a method for receiving an optical signal provided by an embodiment of the present application.

As shown in FIG. 4, the method for receiving an optical signal provided by the embodiment of the present application comprises steps of:

S401, converting a received target optical signal into an I path and a Q path of an analog signal with a local optical carrier by coherent detection.

It should be noted that, the specific process of coherent detection to convert a received target optical signal into an I path and a Q path of an analog signal can be achieved by methods of the prior art. For example, a laser source, a 90-degree optical phase polarizer, two optical couplers and four photodiodes can be used to convert the received target optical signal into the I path and Q path of analog signals. The laser source is used for generating a local optical carrier, the 90-degree optical phase polarizer is used for changing the phase of the target optical signal by 90degrees, the optical couplers are used for coupling optical signals, and the photodiodes are used for converting the target optical signal into the I path and Q path of the analog signal. The present application does not limit the specific implementation ways of this process.

S402, performing analog-to-digital conversion on the I path and the Q path of the analog signal to obtain an I path and a Q path of a digital signal.

It should be noted that, the step of performing analog-to-digital conversion on the I path and the Q path of the analog signal to obtain an I path and a Q path of an digital signal can be achieved by means of analog-to-digital conversion devices of the prior art, the specific process of which will not be repeat here.

S403, performing mPQ-decoding on the I path and the Q path of the digital signal to obtain an original I path data sequence, an original Q path data sequence and an original PPM path data sequence.

Specifically, the step of performing mPQ-decoding on the I path and the Q path of the digital signal to obtain an original I path data sequence, an original Q path data sequence and an original PPM path data sequence comprises:

processing the I path and the Q path of the digital signal according to a preset method to obtain an I path and a Q path of a QPSK-encoded digital signal and an mPPM-encoded PPM path data sequence;

performing mPPM-decoding on the mPPM-encoded PPM path data sequence to obtain the original PPM path data sequence; and performing QPSK-decoding on the I path and the Q path of the QPSK-encoded digital signal to obtain the original I path data sequence and the original Q path data sequence.

It should be noted that, since the specific process of performing mPQ-decoding on the I path and the Q path of the digital signal is an inverse process of the step of performing mPQ-encoding on the I path data sequence, the Q path data sequence and the PPM path data sequence provided by the above method for sending an optical signal, reference can be made to the corresponding content of the mPQ-encoding provided by the above method for sending an optical signal, which will not be repeat here.

S404, performing parallel-to-serial conversion on the original I path data sequence, the original Q path data sequence and the original PPM path data sequence to obtain a target data signal.

It should be noted that, since the specific process of performing parallel-to-serial conversion on the original I path data sequence, the original Q path data sequence and the original PPM path data sequence is an inverse process of the step of performing serial-to-parallel conversion on the data signal to be transmitted provided by the above method for sending an optical signal, reference can be made to the corresponding content of the serial-to-parallel converting provided by the above method for sending an optical signal, which will not be repeat here.

In the above embodiment of a method for sending an optical signal, a sending end shapes the I path and the Q path of the mPQ-encoded digital signal by Nyquist-filtering respectively, or in the embodiment of another method for sending an optical signal, a sending end shapes the intermediate optical signal by Nyquist-filtering. However, since shaping by Nyquist-filtering only changes the spectrum shape of a signal rather than the information of the signal itself, it is not required to add additional algorithm processing to the shaping by Nyquist-filtering operation of the sending end at the receiving end.

Figure 5:
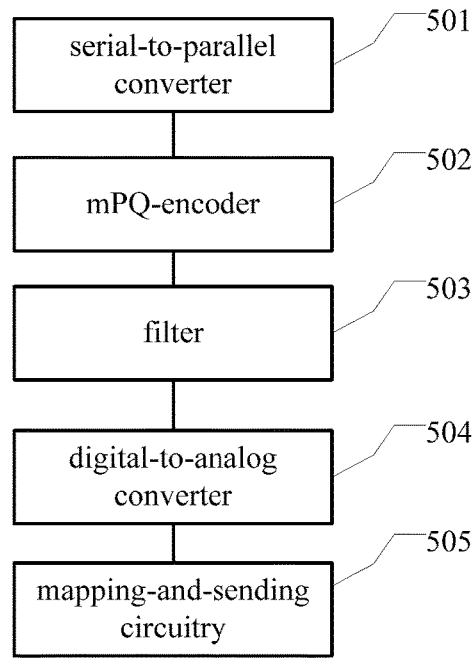
FIG. 5 is a schematic structural view of a device for sending an optical signal provided by an embodiment of the present application.

Corresponding to the method for sending an optical signal based on a scheme in which signals are generated in electric domain, an embodiment of the present application provides a device for sending an optical signal based on the scheme in which signals are generated in electric domain. The device for sending an optical signal comprises: an electric domain generating device and an optical domain mapping device, wherein the electric domain generating device comprises a serial-to-parallel converter 501, an mPQ-encoder 502, a filter 503, a digital-to-analog converter 504; and the optical domain mapping circuitry comprises a mapping-and-sending circuitry 505. As shown in FIG. 5, the device comprises:

a serial-to-parallel converter 501 for performing serial-to-parallel conversion on a data signal to be transmitted to obtain an I path data sequence, a Q path data sequence and a PPM path data sequence which are in parallel;

an mPQ-encoder 502 for performing mPQ-encoding on the I path data sequence, the Q path data sequence and the PPM path data sequence to obtain an I path and a Q path of an mPQ-encoded digital signal;

a filter 503 for shaping the I path and the Q path of the mPQ-encoded digital signal by Nyquist-filtering to obtain an I path and a Q path of a filtered digital signal;

a digital-to-analog converter 504 for performing digital-to-analog conversion on the I path and the Q path of the filtered digital signal to obtain an I path and a Q path of an analog signal; and a mapping-and-sending circuitry 505 for mapping the I path and Q path of the analog signal onto an optical carrier to obtain a target optical signal and send the same.

By applying the embodiments of the present application, a data signal to be transmitted is converted from serial to parallel and the obtained I path data sequence, Q path data sequence and PPM path data sequence which are in parallel are mPQ-encoded; after obtaining an I path and a Q path of anmPQ-encoded digital signal, different from the prior art in which the I path and the Q path of the mPQ-encoded digital signal are converted from digital to analog directly and then are mapped with an optical carrier, the I path and the Q path of the mPQ-encoded digital signal are shaped by Nyquist-filtering and an I path and a Q path of a filtered digital signal are converted from digital to analog and then are mapped with the optical carrier. In the prior art, the method, in which the I path and the Q path of the mPQ-encoded digital signal are converted directly from digital to analog and then are mapped with an optical carrier, sacrifices a large amount of transmission bandwidth when obtaining a high power efficiency, resulting in a decrease in spectral efficiency of transmission signal. The method of the embodiment of the present application, in which the I path and the Q path of the mPQ-encoded digital signal are shaped by Nyquist-filtering, can effectively reduce transmission bandwidth of an optical signal and thereby achieve the purpose of decreasing or even eliminating loss in spectral efficiency while improving power efficiency.

Specifically, the mPQ-encoder 502 comprises:

a QPSK-encoder for performing QPSK-encoding on the I path data sequence and the Q path data sequence to obtain an I path and a Q path of a QPSK-encoded digital signal;

an mPPM-encoder for performing mPPM-encoding on the PPM path data sequence to obtain an mPPM-encoded PPM path data sequence; and a processing sub-circuitry for processing the I path and the Q path of the QPSK-encoded digital signal with the mPPM-encoded PPM path data sequence according to a preset method, to obtain the I path and the Q path of the mPQ-encoded digital signal.

With respect to the embodiments of the device, the description of the embodiments of the device is quite brief since the embodiments of the device are essentially similar with the embodiments of the method, and reference can be made to the parts in the description of the embodiments of method.

Figure 6:
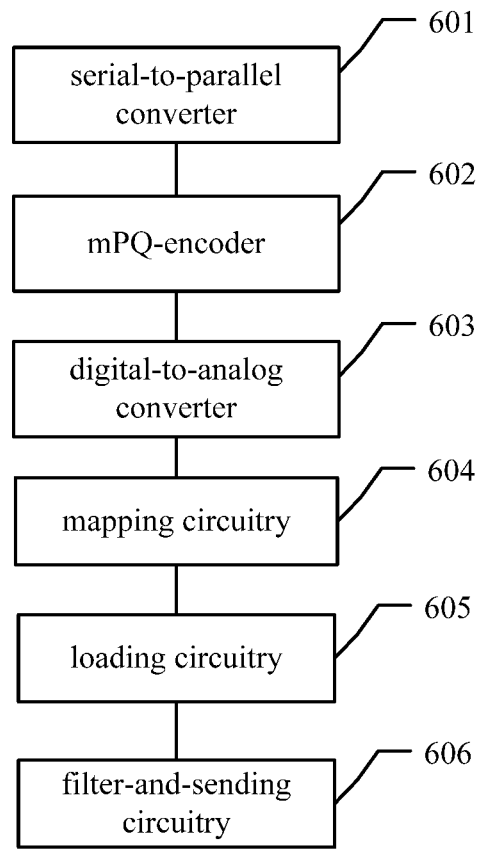
FIG. 6 is a schematic structural view of another device for sending an optical signal provided by an embodiment of the present application.

Corresponding to the another method for sending an optical signal based on a scheme in which signals are generated in optical domain provided by the above method embodiment, an embodiment of the present application provides another device for sending an optical signal based on the scheme in which signals are generated in optical domain. The device for sending an optical signal comprises: an electric domain generating device and an optical domain mapping device, wherein the electric domain generating device comprises a serial-to-parallel converter 601, an mPQ-encoder 602, a digital-to-analog converter 603; and the optical domain mapping circuitry comprises a mapping circuitry 604, a loading circuitry 605 and a filter 606. As shown in FIG. 6, the device comprises:

a serial-to-parallel converter 601 for performing serial-to-parallel conversion on a data signal to be transmitted to obtain an I path data sequence, a Q path data sequence and a PPM path data sequence which are in parallel;

an mPQ-encoder 602 for encoding the I path data sequence, the Q path data sequence and the PPM path data sequence to obtain an I path and a Q path of a QPSK-encoded digital signal and an mPPM-encoded PPM path data sequence;

a digital-to-analog converter 603 for performing digital-to-analog conversion on the I path and the Q path of the QPSK-encoded digital signal and the mPPM-encoded PPM path data sequence to obtain an I path, a Q path and a PPM path of an encoded analog signal;

a mapping circuitry 604 for mapping the I path and the Q path of the analog signal onto an optical carrier to obtain an optical signal;

a loading circuitry 605 for loading the PPM path of the analog signal into the optical signal to obtain an intermediate optical signal; and a filter-and-sending circuitry 606 for shaping the intermediate optical signal by Nyquist-filtering to obtain a target optical signal and send the same.

By applying the embodiment of the present application, a data signal to be transmitted is converted from serial to parallel and the obtained I path data sequence, Q path data sequence and PPM path data sequence which are in parallel are encoded; after obtaining an I path and a Q path of a QPSK-encoded digital signal and an mPPM-encoded PPM path data sequence, the I path and the Q path of the QPSK-encoded digital signal and the mPPM-encoded PPM path data sequence are converted respectively from digital to analog in order to obtain an I path, a Q path and a PPM path of anencoded analog signal; the I path and the Q path of the analog signal are mapped onto the optical carrier to obtain an optical signal; the PPM path of the analog signal is loaded into the optical signal to obtain an intermediate optical signal; the intermediate optical signal is shaped by Nyquist-filtering to obtain a target optical signal and send the same. By using the mPQ-encoding method, power efficiency can be improved and the intermediate optical signal can be shaped by Nyquist-filtering after the intermediate optical signal is obtained, which can effectively reduce transmission bandwidth of the optical signal and thereby improve spectral efficiency compared with the prior art.

Specifically, the mPQ-encoder 602 comprises:

a QPSK-encoder for performing QPSK-encoding on the I path data sequence and the Q path data sequence to obtain the I path and the Q path of the QPSK-encoded digital signal; and an mPPM-encoder for performing mPPM-encoding on the PPM path data sequence to obtain the mPPM-encoded PPM path data sequence.

With respect to the embodiments of the device, the description of the embodiments of the device is quite brief since the embodiments of the device are essentially similar with the embodiments of the method, and reference can be made to the parts in the description of the embodiments of method.

Figure 7:
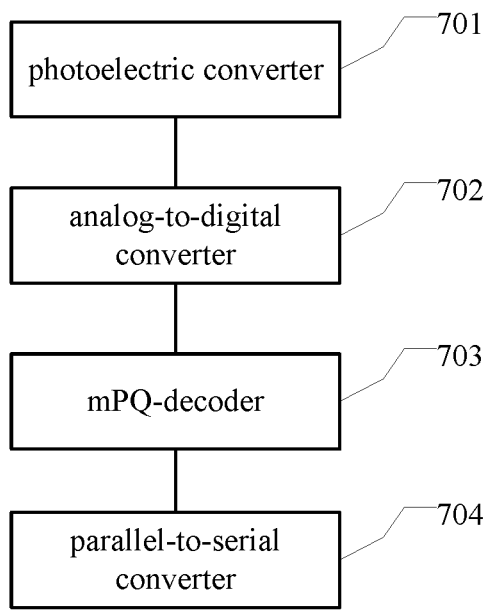
FIG. 7 is a schematic structural view of a device for receiving an optical signal provided by an embodiment of the present application.

Corresponding to the method for receiving an optical signal provided by the above method embodiment, an embodiment of the present application provides a device for receiving an optical signal. The device for receiving an optical signal comprises: a photoelectric converting device and an electric signal processing device, wherein the photoelectric converting device comprises a photoelectric converter 701; the electric signal processing device comprises an analog-to-digital converter 702, an mPQ-decoder 703 and a parallel-to-serial converter 704. As shown in FIG. 7, the device comprises:

a photoelectric converter 701 for converting a received target optical signal into an I path and a Q path of an analog signal with a local optical carrier by coherent detection;

an analog-to-digital converter 702 for performing analog-to-digital conversion on the I path and the Q path of the analog signal to obtain an I path and a Q path of a digital signal;

an mPQ-decoder 703 for performing mPQ-decoding on the I path and the Q path of the digital signal to obtain an original I path data sequence, an original Q path data sequence and an original PPM path data sequence; and a parallel-to-serial converter 704 for performing parallel-to-serial conversion on the original I path data sequence, the original Q path data sequence and the original PPM path data sequence to obtain a target data signal.

Specifically, the mPQ-decoder 703 comprises:

a processing sub-circuitry for processing the I path and the Q path of the digital signal according to a preset method to obtain an I path and a Q path of a QPSK-encoded digital signal and an mPPM-encoded PPM path data sequence;

an mPPM-decoder for performing mPPM-decoding on the mPPM-encoded PPM path data sequence to obtain the original PPM path data sequence; and a QPSK-decoder for performing QPSK-decoding on the I path and the Q path of the QPSK-encoded digital signal to obtain the original I path data sequence and the original Q path data sequence.

With respect to the embodiments of the device, the description of the embodiments of the device is quite brief since the embodiments of the device are essentially similar with the embodiments of the method, and reference can be made to the parts in the description of the embodiments of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements not only comprise those elements listed, but also comprise other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices, which comprise the listed elements.

Various embodiments in the description are all described in a corresponding manner. Reference to each other can be made for the same or similar parts between various embodiments and the description of each embodiment focuses on the differences between them. In particular, the description of the embodiments of a system is quite brief since the embodiments of a system are essentially similar with the embodiments of a method, and reference can be made to the parts in the description of the embodiments of method.

Those of ordinary skills in the art can understand that all or part of the processes of the above embodiments of a method can be realized by means of instructing related hardware with programs, the program can be stored in a computer readable storage medium. Wherein said storage medium for example is a ROM/RAM, a diskette, an optical disc and the like.

The embodiments described above are just preferable embodiments of the present application, and are not intended to limit the protection scope of the present application. Any modifications, equivalent alternatives, improvements or the like within the spirit and principle of the present application fall into the protection scope of the present application.

The invention claimed is:

1. A method for sending an optical signal, wherein the method comprises steps of:

performing serial-to-parallel conversion on a data signal to be transmitted to obtain an I path data sequence, a Q path data sequence and a PPM path data sequence which are in parallel;

performing combined encoding of M-ary Pulse Position Modulation and Quadrature Phase-Shift Keying (mPQ-encoding) on the I path data sequence, the Q path data sequence and the PPM path data sequence to obtain an I path and a Q path of an mPQ-encoded digital signal;

shaping the I path and the Q path of the mPQ-encoded digital signal by Nyquist-filtering to obtain an I path and a Q path of a filtered digital signal;

performing digital-to-analog conversion on the I path and the Q path of the filtered digital signal to obtain an I path and a Q path of an analog signal; and mapping the I path and the Q path of the analog signal onto an optical carrier to obtain a target optical signal and send the same.

2. The method according to claim 1, wherein the step of performing mPQ-encoding on the I path data sequence, the Q path data sequence and the PPM path data sequence to obtain an I path and a Q path of an mPQ-encoded digital signal comprises:

performing Quadrature Phase-Shift Keying (QPSK)-encoding on the I path data sequence and the Q path data sequence to obtain an I path and a Q path of a QPSK-encoded digital signal;

performing M-ary Phase Position Modulation (mPPM)-encoding on the PPM path data sequence to obtain an mPPM-encoded PPM path data sequence; and processing the I path and Q path of the QPSK-encoded digital signal with the mPPM-encoded PPM path data sequence according to a preset method, to obtain the I path and the Q path of the mPQ-encoded digital signal.

3. A method for sending an optical signal, wherein the method comprises steps of:

performing serial-to-parallel conversion on a data signal to be transmitted to obtain an I path data sequence, a Q path data sequence and a PPM path data sequence which are in parallel;

encoding the I path data sequence, the Q path data sequence and the PPM path data sequence to obtain an I path and a Q path of a Quadrature Phase-Shift Keying (QPSK)-encoded digital signal and an mPPM -encoded PPM path data sequence;

performing digital-to-analog conversion on the I path and the Q path of the QPSK-encoded digital signal and the M-ary Phase Position Modulation (mPPM)-encoded PPM path data sequence to obtain an I path, a Q path and a PPM path of an encoded analog signal;

mapping the I path and the Q path of the analog signal onto an optical carrier to obtain an optical signal;

loading the PPM path of the analog signal into the optical signal to obtain an intermediate optical signal; and shaping the intermediate optical signal by Nyquist-filtering to obtain a target optical signal and send the same.

4. The method according to claim 3, wherein the step of encoding the I path data sequence, the Q path data sequence and the PPM path data sequence to obtain an I path and a Q path of a QPSK-encoded digital signal and an mPPM-encoded PPM path data sequence comprises:

performing QPSK-encoding on the I path data sequence and the Q path data sequence to obtain the I path and the Q path of the QPSK-encoded digital signal; and performing mPPM-encoding on the PPM path data sequence to obtain the mPPM-encoded PPM path data sequence.

5. A method for receiving an optical signal based on the method for sending an optical signal according to claim 1, wherein the method for receiving an optical signal comprises steps of:

converting a received target optical signal into an I path and a Q path of an analog signal with a local optical carrier by coherent detection;

performing analog-to-digital conversion on the I path and the Q path of the analog signal to obtain an I path and a Q path of a digital signal;

performing mPQ-decoding on the I path and the Q path of the digital signal to obtain an original I path data sequence, an original Q path data sequence and an original PPM path data sequence; and performing parallel-to-serial conversion on the original I path data sequence, the original Q path data sequence and the original PPM path data sequence to obtain a target data signal.

6. The method for receiving an optical signal according to claim 5, wherein the step of performing mPQ-decoding on the I path and the Q path of the digital signal to obtain an original I path data sequence, an original Q path data sequence and an original PPM path data sequence comprises:

processing the I path and the Q path of the digital signal according to a preset method to obtain an I path and a Q path of a QPSK-encoded digital signal and an mPPM-encoded PPM path data sequence;

performing mPPM-decoding on the mPPM-encoded PPM path data sequence to obtain the original PPM path data sequence; and performing QPSK-decoding on the I path and the Q path of the QPSK-encoded digital signal to obtain the original I path data sequence and the original Q path data sequence.

7. A device for sending an optical signal, wherein the device comprises:

a serial-to-parallel converter for performing serial-to-parallel conversion on a data signal to be transmitted to obtain an I path data sequence, a Q path data sequence and a PPM path data sequence which are in parallel;

an mPQ-encoder for performing mPQ-encoding on the I path data sequence, the Q path data sequence and the PPM path data sequence to obtain an I path and a Q path of an mPQ-encoded digital signal;

a filter for shaping the I path and the Q path of the mPQ-encoded digital signal by Nyquist-filtering to obtain an I path and a Q path of a filtered digital signal;

a digital-to-analog converter for performing digital-to-analog conversion the I path and the Q path of the filtered digital signal to obtain an I path and a Q path of an analog signal; and a mapping-and-sending circuitry for mapping the I path and the Q path of the analog signal onto an optical carrier to obtain a target optical signal and send the same.

8. The device according to claim 7, wherein the mPQ-encoder comprises:

a QPSK-encoder for performing QPSK-encoding on the I path data sequence and the Q path data sequence to obtain an I path and a Q path of a QPSK-encoded digital signal;

an mPPM-encoder for performing mPPM-encoding on the PPM path data sequence to obtain an mPPM-encoded PPM path data sequence; and a processing sub-circuitry for processing the I path and the Q path of the QPSK-encoded digital signal with the mPPM-encoded PPM path data sequence according to a preset method, to obtain the I path and the Q path of the mPQ-encoded digital signal.

9. A device for sending an optical signal, wherein the device comprises:

a serial-to-parallel converter for performing serial-to-parallel conversion on a data signal to be transmitted to obtain an I path data sequence, a Q path data sequence and a PPM path data sequence which are in parallel;

an mPQ-encoder for encoding the I path data sequence, the Q path data sequence and the PPM path data sequence to obtain an I path and a Q path of a QPSK-encoded digital signal and an mPPM-encoded PPM path data sequence;

a digital-to-analog converter for performing digital-to-analog conversion on the I path and the Q path of the QPSK-encoded digital signal and the mPPM-encoded PPM path data sequence to obtain an I path, a Q path and a PPM path of an encoded analog signal;

a mapping circuitry for mapping the I path and the Q path of the analog signal onto an optical carrier to obtain an optical signal;

a loading circuitry for loading the PPM path of the analog signal into the optical signal to obtain an intermediate optical signal; and a filter-and-sending circuitry for shaping the intermediate optical signal by Nyquist-filtering to obtain a target optical signal and send the same.

10. A device for receiving an optical signal based on the device for sending an optical signal according to claim 7, wherein the device for receiving an optical signal comprises:

a photoelectric converter for converting a received target optical signal into an I path and a Q path of an analog signal with a local optical carrier by coherent detection;

an analog-to-digital converter for performing analog-to-digital conversion on the I path and the Q path of the analog signal to obtain an I path and a Q path of a digital signal;

an mPQ-decoder for performing mPQ-decoding on the I path and the Q path of the digital signal to obtain an original I path data sequence, an original Q path data sequence and an original PPM path data sequence; and a parallel-to-serial converter for performing parallel-to-serial conversion on the original I path data sequence, the original Q path data sequence and the original PPM path data sequence to obtain a target data signal.

* * * * *